United States Patent
Shimojima

[11] 4,141,636
[45] Feb. 27, 1979

[54] ZOOM LENS WITH MOVABLE DIAPHRAGM

[75] Inventor: Masatoshi Shimojima, Tokyo, Japan

[73] Assignee: Vivitar Corporation, Santa Monica, Calif.

[21] Appl. No.: 750,828

[22] Filed: Dec. 15, 1976

[30] Foreign Application Priority Data

Jan. 20, 1976 [JP] Japan ................................ 51/4228[U]

[51] Int. Cl.² ........................................... G02B 15/00
[52] U.S. Cl. ...................................... 354/196; 350/187
[58] Field of Search ........................ 350/187; 354/196

[56] References Cited
U.S. PATENT DOCUMENTS

| | | | |
|---|---|---|---|
| 3,589,259 | 6/1971 | Imai | 354/270 |
| 3,631,787 | 1/1972 | Shimizu | 354/274 |
| 3,687,047 | 8/1972 | Ito | 354/274 |
| 3,706,269 | 12/1972 | Vesugi | 354/274 |
| 3,710,706 | 1/1976 | Sanada | 354/270 |
| 3,889,282 | 6/1975 | Hashimoto | 354/196 |
| 3,970,366 | 7/1976 | Sekiguchi | 350/187 X |

*Primary Examiner*—Paul A. Sacher
*Attorney, Agent, or Firm*—DeLio and Montgomery

[57] ABSTRACT

A mechanism for a zoom lens of the type in which the aperture defining diaphragm mechanism moves axially of the lens and changes the position of the exit pupil, where the mechanism modifies the aperture with changing focal length to maintain constant relative aperture at full relative aperture and further predetermines the stop down of the diaphragm mechanism as a function of selected relative aperture and focal length.

15 Claims, 9 Drawing Figures

ZOOM LENS WITH MOVABLE DIAPHRAGM

This invention relates to lenses and more particularly relates to zoom lenses where the aperture defining diaphragm mechanism is moved axially along the lens housing during zooming.

Where, the aperture defining diaphragm mechanism moves with a lens grouping during a zooming operation, the exit pupil as seen from the film plane will vary in size, the exit pupil being an image of the limiting aperture formed by the elements succeeding it. Since the exit pupil size relates to exposure, it is necessary that the aperture change as a function of focal length change for the proper exposure.

The F/number denoting the relative aperture may be defined as one half the sine of the angle defined by a line drawn from edge of the exit pupil to the axis at the image plane and the optical axis. Accordingly, as the exit pupil moves axially the aperture must vary in diameter to provide a constant relative aperture.

This problem is not presented in lenses which have fixed apertures and fixed elements following the aperture. The problem is tolerated in some shorter focal length zoom lenses which have different maximum relative apertures at different ends of the zoom range. Various mechanisms have been suggested to overcome the problem of change in relative aperture with zooming, but such known mechanisms have been complicated, did not operate smoothly, and did not modify the aperture at the lowest F/number (maximum relative aperture) for viewing and light metering.

Accordingly, the present invention provides a new, improved and simplified mechanism for a zoom lens of the type in which the diaphragm mechanism moves, and where the aperture diameter is modified as a function of focal length, to maintain constant relative aperture both at full aperture and selected lesser relative aperture.

The stop down mechanism of a lens for a single lens reflex camera generally comprises a rotatable diaphragm control member which pivots the diaphragm blades to define an aperture. A stop member is connected in some manner to the control member and adapted to contact a stopping member which limits rotation of the control member to a degree determined by the selected relative aperture. The control member is rotated by a mechanism, usually including a rod, connected to a stop down actuating member in the camera.

Briefly stated, the invention in one form thereof in a zoom lens having a diaphragm mounting member which moves with change in focal length, comprises a stopping surface or edge positionable with the aperture setting ring as a function of the selected F/number and defining an engagement position with a stop member connected to the diaphragm control member. When the diaphragm control member is rotated to stop down the aperture to the selected F/number, the stop member contacts the stopping edge or surface at a point which determines the aperture size and maintains the F/number constant regardless of focal length. Additionally, the aperture stop-down rod extending rearwardly for the diaphragm control is provided with a camming edge in contact with a stationary member such that the diaphragm control member is rotated to modify the aperture as a function of focal length as the lens is zoomed for viewing and metering purposes, prior to exposure stop down of the aperture.

An object of this invention is to provide a new and improved mechanism for modifying the aperture of a zoom lens, where the aperture defining diaphragm mechanism moves with zooming, and as a function of focal length to maintain a constant selected relative aperture over the zooming range.

Another object of this invention is to provide new and improved means for modifying the aperture of a zoom lens, where the aperture defining mechanism moves with zooming, so that the exit pupil of the lens as seen from the image plane transmits a constant volume of light for a selected relative aperture.

A further object of this invention is to provide a new and improved zooming and focusing mechanism for a zoom lens.

The features of the invention which are believed to be novel are particularly pointed out and distinctly claimed in the concluding portion of this specification. The invention, however, both as to its organization and operation together with further objects and advantages thereof may best be appreciated by reference to the following detailed description taken in conjunction with the drawings, wherein:

Figure 1:
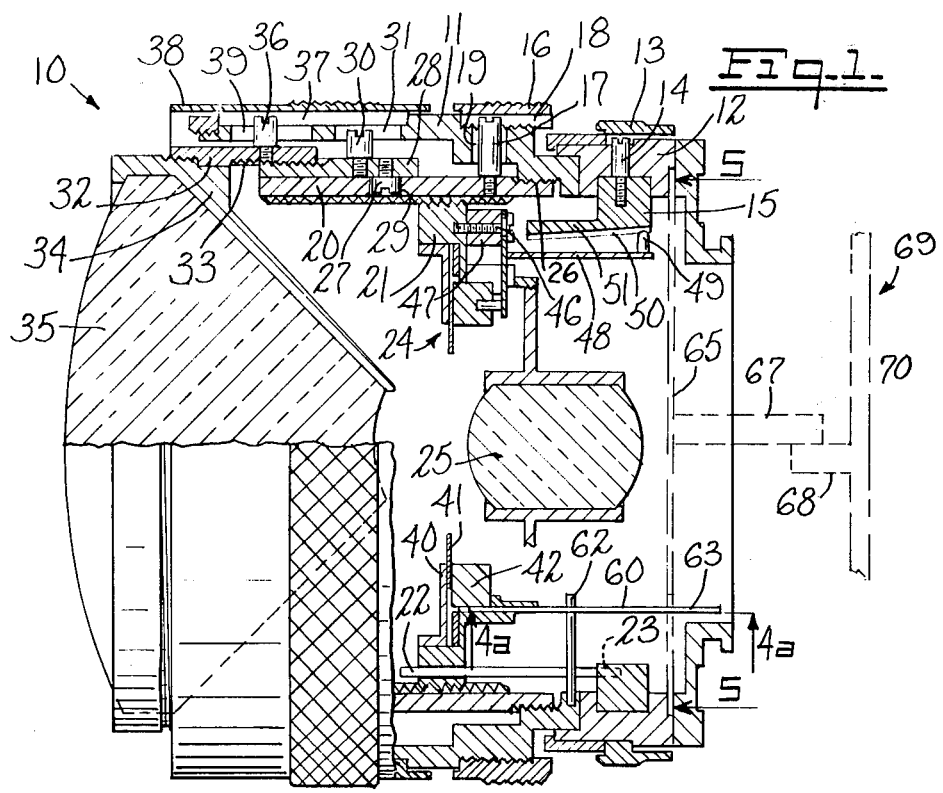
FIG. 1 is a side elevation, in section of a lens embodying the invention.

A lens 10 embodying the invention is first described with reference to FIGS. 1 and 2. Lens 10 comprises a main housing member 11 with a rear auxiliary housing member 12 thereon. Rotatably mounted to housing 12 is a relative aperture setting ring 13 connected by a pin 14 to an aperture ring 15. The relative aperture setting mechanisn is hereinafter described.

A zoom operating ring 16 is rotatably mounted on housing 11, and receives a pin 17 in an axial slot 18 therein which extends through a lateral slot 19 in housing 11 and is received in a zoom ring 20.

Zoom ring 20 is internally threaded and receives therein mounting member 21 on mating threads. Mounting member 21 is prevented from rotation, as for example by a rod 22 extending therethrough and anchored at 23 on housing 11 or 12. Other means may be provided for ensuring only linear movement of mounting member 21. Mounting member 21 carries an aperture defining diaphragm mechanism 24 and rear lens grouping 25.

Zoom ring 20 is threaded to housing 11 to 26 and moves rotatively and axially upon rotation of ring 16. A pin 27 carried by a ring 28 extends into a cam slot 29 in zoom ring 20. A second pin 30 in ring 28 extends into an axial slot 31 in housing 11.

As thus far described, when zoom control ring 16 is rotated, ring 20 rotates and mounting member 21 advances axially on the mating threads at a rate determined by the pitch of the threads. As zoom ring 20 rotates, ring 28 moves axially in slot 31 at a rate and direction determined by the contour of cam slot 29.

A focusing mount 32 is threaded to ring 28 at 33 and moves axially with ring 28 during zooming. Focusing mount 32 carries a mount 34 for a front negative lens grouping 35. A pin 36 extends from focusing mount 32 into an axial slot 37 in a focus ring 38 through lateral slot 39 in housing 11. Thus, lens grouping 35 may be moved axially for focusing by rotation of ring 38.

Upon rotation of zoom control ring 16, lens groupings 25 and 35 will move at rates predetermined by the various threads and cam slots. Such movements will depend upon the optical design of the lens groupings. A lens which may utilize the herein disclosed mechanism is disclosed in co-pending application Ser. No. 750,829, filed Dec. 15, 1976. This co-pending application discloses the optics of a lens where grouping 25 moves axially forward to increase the focal length while lens grouping 35 moves to maintain focus.

As mounting member 21 moves axially with the aperture defining mechanism 24 and lens grouping 25, the position of the exit pupil will change, resulting in a change of relative aperture if no aperture compensation is provided.

Figure 3:
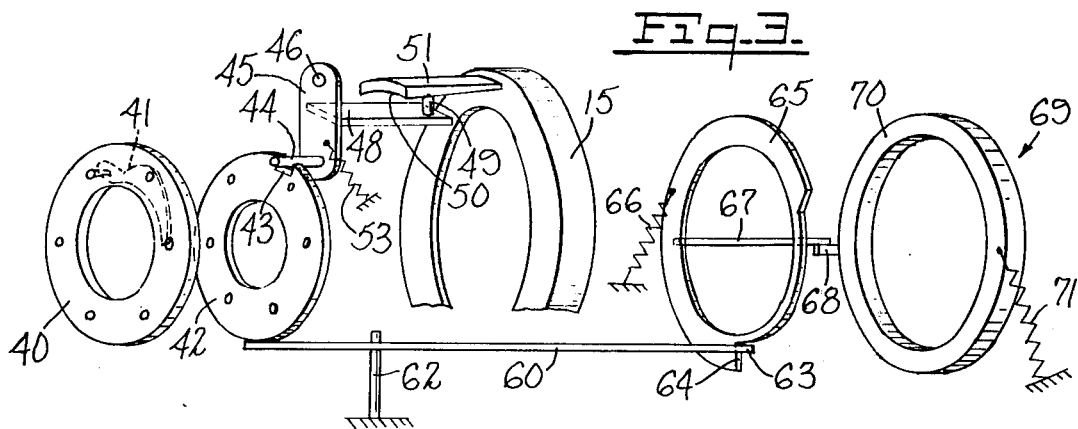
FIG. 3 is a diagrammatic expanded view in perspective, of the aperture determining mechanism of the lens of FIG. 1.
Figure 2:
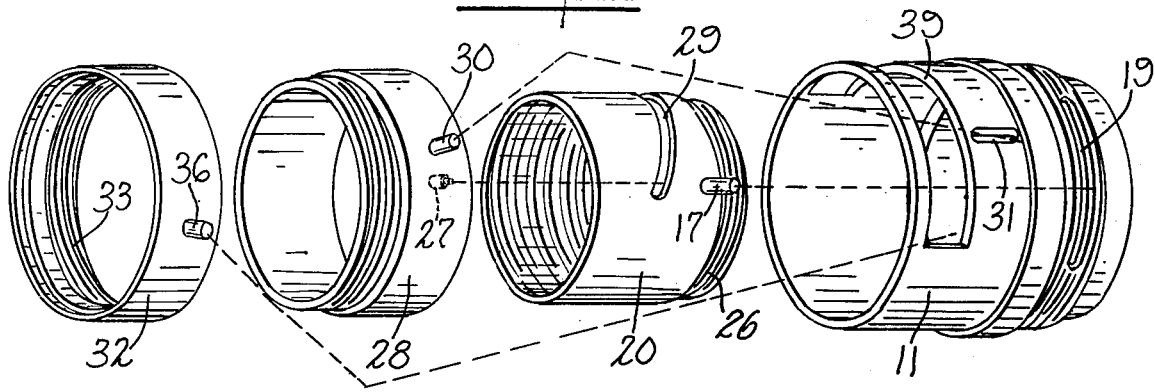
FIG. 2 is a view, in perspective, of disasssembled portions of the lens of FIG. 1.

Reference is now made to FIGS. 1 and 3. Diaphragm mechanism 24 comprises a fixed ring 40 having a plurality of diaphgram or iris blades 41 pivotally mounted thereto (only one shown in FIG. 3). Blades 41 are also connected to aperture control ring 42 so that rotation of ring 42 determines the aperture defined by blades 41. This is conventional construction.

Aperture control ring 42 has a slot 43 therein which receives a pin 44 on the lower end of a lever 45 pivoted at its upper end, through a pin 46 and spacer 47, to mounting member 21. Lever 45 has a rearwardly extending arm 48 which is arranged to cooperate with a cam or stopping surface 50 on an arm 51 extending from aperture ring 15. The undersurface 50 of arm 51 is axially contoured as a function of focal length. When projection 49 engages surface 50, the point of contact determines the aperture of the lens as a function of focal length and maintains a constant selected relative aperture (F/number) over the focal length range of the lens. A spring 53 biases control ring 42 through lever 45 toward a full aperture position, which is determined, as hereinafter described, as a function of focal length. When ring 42 is moved counter-clockwise as viewed in FIG. 3, it will move the diaphragm blades 41 to a stop position determined by the angular position of stopping surface 50 and arm 51.

Figure 4A:
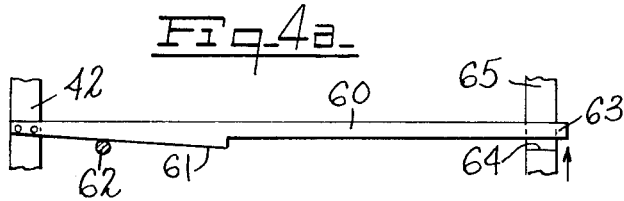
FIG. 4a is a view seen in the plane of lines 4a—4a of FIG. 1, showing a diaphragm operating rod.
Figure 4B:
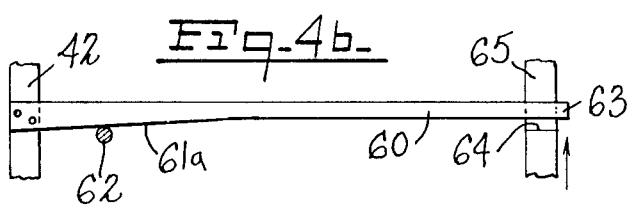
FIG. 4b is a view similar to FIG. 4a, of another diaphragm operating rod.
Figure 5:
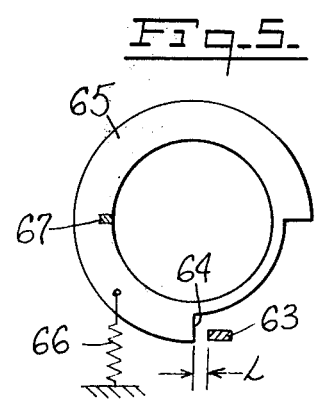
FIG. 5 is a view seen in the plane of lines 5—5 of FIG. 1.

An aperture stop down rod 60 is rigidly connected to aperture control ring 42 and extends rearwardly thereof. Rod 60 has a camming surface 61 thereon which normally bears on a fixed surface in housing 11, exemplified by pin 62. At full aperture, constant relative aperture is determined by cam 61 being urged against pin 62 by spring 53. As mounting member 21 moves axially, cam surface 61 bearing on a pin 62 rotates control ring 42 to vary the aperture defined by blades 41 as a function of focal length. Also, projection 49 is slightly rotated to maintain axial moving clearance with surface 50, where necessary. As shown in FIG. 4a, the camming surface 61 may decrease the aperture with focal length, while the cammming surface 61a of FIG. 4b may increase the aperture with focal length. The shape of the camming surface on rod 60 will be determined by the optical parameters of the lens system, and maybe linear or curved as required.

The free end 63 of rod 60 extends adjacent a shoulder 64 of an aperture stop down ring 65 biased by a spring 66. Spring 66 is stronger than spring 53. Ring 65 has an arm 67 thereon normally engaged by an arm 68 of a camera stop down mechanism 69. As shown, the camera mechanism comprises a ring 70 biased by a spring 71. Ring 70 is rotated clockwise (as shown in FIG. 3) by spring 71 when the camera shutter is released, or just prior thereto and is exemplary of any camera stop down mechanism. This releases stop down ring 65, shoulder 64 engages rod 60, rotates control ring 42, pivots lever 45 until projection 49 engages the stopping member, surface 50, and stops down the aperture defining diaphragm mechanism to the predetermined relative aperture. Spring 66 is selected to be less strong than spring 71. In this manner the selected relative aperture is maintained.

As shown the axial position of stop projection 49, with respect to surface 50 will determine the final aperture dimension as a function of focal length, since surface 50 is contoured axially as a function of focal length.

The end 63 of rod 60 has a variable clearance L with shoulder 64 to permit setting of the aperture with focal length to maintain constant selected relative aperture. As mounting member 21 moves axially to change focal length, there will be slight rotative movement of rod 60, control ring 42 and projection 49.

Figure 6A:
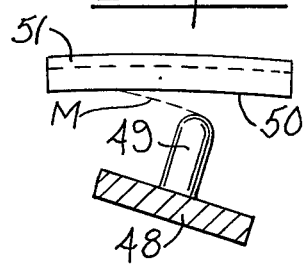
FIGS. 6a and 6b are views, somewhat schematic, of portions of the stop down mechanism of the lens of FIG. 1.

FIG. 6a exemplifies the relation of projection 49 and surface 50 at an intermediate selected relative aperture, with arm 48 in the full aperture position. The position of arm 48 and control ring 42 will be modified by the cam of rod 60 as a function of focal length at full relative aperture. However, it is the angular position of surface 50 which determines the selected stop down relative aperture. When aperture ring 65 is released, projection 49 moves along the line M until it engages surface 50, stopping down the aperture to the selected F/number.

If the lens were to be utilized at full aperture, surface 50 would be positioned with respect to projection 49 so closely that there would only be clearance for projection 49 to move axially without binding, or to have light sliding contact thereon. In this situation, during change of focal length or zooming, diaphragm control ring 42 under the influence of rod 60 would rotate slightly to maintain the positioned relation of projection 49 with respect to the focal length contoured surface 50.

Figure 6B:
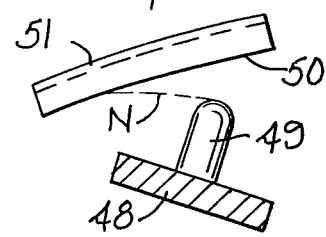

FIG. 6b exemplifies ring 51 and surface 50 set to a smaller relative aperture. It will be noted that projection 49 will move further along the line N from the full aperture position before contacting surface 50 which defines the stop for the selected relative aperture, thus resulting in a lesser aperture being defined by diaphragm mechanism 24.

Where the camera is of the stop down metering type, the operation is the same, only the diaphragm is initially stopped down when the metering system is activated, rather than just prior to exposure. Depending on the mechanics of the camera, the diaphragm may then be reset to full aperture if desired.

Figure 7:
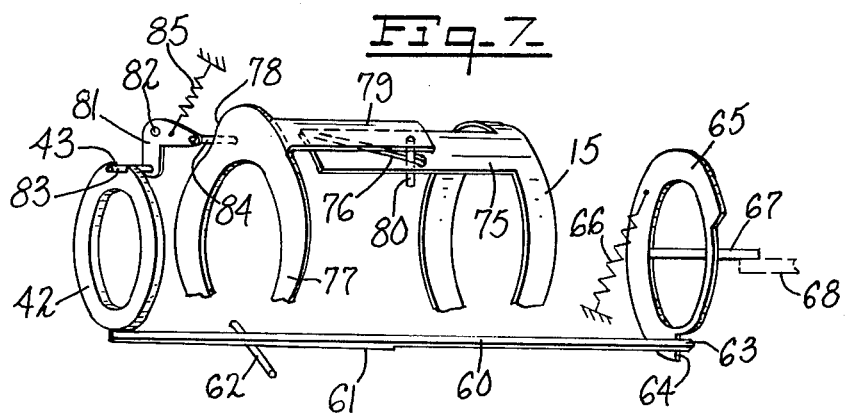
FIG. 7 is an expanded view in perspective of an alternate aperture determining mechanism embodying the invention.

Another embodiment of the invention is shown in FIG. 7 where reference numerals similar to those of FIG. 3 identify similar elements. Aperture ring 15 has an arm 75 extending therefrom with a cam slot 76 defined therein as a function of focal length. A stopping member in the form of a ring 77 is rotatable on mounting member 21, and defines a contoured stopping surface or edge 78 thereon. An arm 79 extends rearwardly of ring 77 and has a follower 80 in cam slot 76. Ring 77 will rotate slightly with axial movement of member 21 and position surface 78 as a function of focal length, as well as selected relative aperture. A lever 81 is pivoted to member 21 at 82, and carries a pin 83 at one end thereof in slot 43 of diaphragm control ring 42. A top pin 84 extends from the other end of lever 81 past surface 78. The stop down position of the diaphragm is determined by the position of surface 78. Lever 81 and diaphragm control ring 42 are biased toward the open position by spring 85, and spring 85 urges rod 60 into engagement with pin 62. With increase in focal length (ring 77 moving forward) ring 77 moves counter-clockwise (as viewed in FIG. 7) and surface 78 is positioned to stop pin 84 as a function of focal length.

Where the lens is made to be utilized with a fully automatic camera of the shutter preferred type and the aperture selection ring is set to the EE or equivalent setting, the connection between selection ring 13 and aperture ring 15 may be made disconnectable and stop down positioning of aperture ring 15 placed under selection control of the camera.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. In a variable focal length lens comprising an aperture defining diaphragm mechanism including a rotatable diaphragm control member, a mounting member for said diaphragm mechanism movable axially of the lens as a function of focal length, an aperture setting member and an aperture stop down mechanism actuable from a camera mechanism; means for maintaining a selected relative aperture of the lens constant with change in focal length comprising stopping means positionable by said setting member for predetermining the relative aperture defined by the diaphragm mechanism, means connecting said diaphragm control member to a stop member normally not contacting said stopping member but movable into contact with said stopping member to determine the aperture defined by said diaphragm mechanism, said stopping means having a contour thereon which is a function of the focal length range of the lens whereby the absolute aperture defined by said diaphragm mechanism is a function of focal length of the lens upon stop down, and means responsive to said stop down mechanism for actuating said diaphragm control member to cause said stop member to engage said stopping member, said means responsive to said stop down mechanism also being responsive to axial movement of said diaphragm mechanism for actuating said diaphragm control member to vary the diaphragm defined aperture as a function of focal length prior to stop down of the diaphragm mechanism.

2. The lens of claim 1 wherein said means responsive to said stop down mechanism comprises a rod-like member extending rearwardly from said control member to a position spaced from but engageable by said stop down mechanism, said rod-like member having an edge thereon contoured as a function of the focal length range of said lens, said edge normally engaging a fixed member in said lens whereby as said actuating member moves axially, said edge moves over said fixed member and rotates said control member as a function of focal length.

3. The lens of claim 1 wherein said stopping means comprises means defining an axially extending surface from said aperture setting member, said surface being contoured as a function of lens focal length.

4. The lens of claim 3 wherein said stop member extends from a lever pivoted to the mounting member, said lever being connected to said control ring whereby rotation of said control ring pivots said lever.

5. The lens of claim 1 wherein said stopping means comprises means connected to said setting member and positionable by said setting member as a function of selected relative aperture, and further positionable upon axial movement of said mounting member as a function of focal length.

6. The lens of claim 5 wherein said means connected to said setting ring comprises stopping member rotatable with respect to said mounting member and axially movable therewith, said stopping member having a guiding connection to said setting ring whereby said stopping member is positioned angularly as a function of focal length with axial movement of the mounting member.

7. The lens of claim 6 wherein said stop member extends from a lever pivoted to the mounting member, said lever connected to said control ring whereby rotation of said control ring pivots said lever.

8. In a variable focal length lens wherein an aperture defining diaphragm mechanism includes a rotatable diaphragm control ring movable axially, a mounting member for said diaphragm mechanism, a rotatable aperture setting member, and an aperture stop down mechanism actuable from a camera; a rod-like member affixed to and extending rearwardly from said control ring to a position spaced from but engageable by said top down mechanism, said rod-like member having an edge thereon contoured as a function of the focal length range of said lens, a fixed member in said lens, said edge normally engaging said fixed member in said lens whereby as said control ring moves axially said contoured edge moves along said fixed member and rotates said control ring as a function of focal length, and a stopping member on said aperture setting member predetermining the position of said aperture control ring at stop down as a function of focal length whereby when said stop down mechanism is actuated said rod-like member is moved away from said fixed member to rotate said control ring to a position determined by said stopping member.

9. The lens of claim 8 wherein said stopping member defines a stopping surface which is contoured as a function of selected relative aperture and focal length, and a stop member is connected to said control ring and adapted to contact said stopping surface when said control ring is rotated by said stop down mechanism through said rod-like member.

10. In a variable focal length lens comprising an aperture defining diaphragm mechanism including a rotatable diaphragm control member, a mounting member for said diaphragm mechanism movable axially of the lens as a function of focal length, an aperture selecting member, and an aperture stop down mechanism actuable from a camera mechanism; means for maintaining a selected relative aperture of the lens constant with change in focal length comprising stopping means positionable by said selecting member for predetermining the relative aperture defined by the diaphragm mechanism, means connecting said diaphragm control member to a stop member normally not contacting said stopping member but movable into contact with said stopping member to determine the aperture defined by said diaphragm mechanism, said stopping means having a contour thereon which is a function of the focal length range of the lens whereby the absolute aperture defined by said diaphragm mechanism is a function of focal length of the lens upon stop down, and means responsive to the stop down mechanism for actuating said diaphragm control member to cause said stop member to engage said stopping member whereby the aperture defined by said diaphragm mechanism is a function of focal length.

11. The lens of claim 10 wherein said stopping means comprises means defining an axially extending surface from said aperture selecting member, said surface being contoured as a function of lens focal length.

12. The lens of claim 11 wherein said stop member extends from a lever pivoted to the mounting member, said lever connected to said control ring whereby rotation of said control ring pivots said lever.

13. The lens of claim 10 wherein said stopping means comprises means connected to said selecting member and positionable by said selecting member as a function of selected relative aperture, and further positionable upon axial movement of said mounting member as a function of focal length.

14. The lens of claim 13 wherein said means connected to said selecting member comprises a stopping member rotatable with respect to said mounting member and axially movable therewith, said stopping member having a guiding connection to said selecting member whereby said stopping member is positioned angularly as a function of focal length with axial movement of the mounting member.

15. The lens of claim 14 wherein said stop member extends from a lever pivoted to the mounting member, said lever connected to said control ring whereby rotation of said control ring pivots said lever.

* * * * *

UNITED STATES PATENT AND TRADEMARK OFFICE
CERTIFICATE OF CORRECTION

PATENT NO. : 4,141,636
DATED : February 27, 1979
INVENTOR(S) : Masatoshi Shimojima It is certified that error appears in the above-identified patent and that said Letters Patent are hereby corrected as shown below:

Column 1, line 62, change "for" to --of--.

Column 3, line 66, change "cammming" to --camming--.

Column 6, line 22, after "comprises" insert --a--.

Column 6, line 41, change "top" to --stop--.

Signed and Sealed this

Fifth Day of June 1979

[SEAL]

Attest:

RUTH C. MASON
Attesting Officer

DONALD W. BANNER
Commissioner of Patents and Trademarks